United States Patent [19]

Stuntebeck et al.

[11] Patent Number: 6,065,016
[45] Date of Patent: *May 16, 2000

[54] UNIVERSAL DIRECTORY SERVICE

[75] Inventors: Peter H. Stuntebeck, Little Silver; Andrew Frederick Bulfer, Mountain Lakes, both of N.J.

[73] Assignee: AT&T Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/689,212

[22] Filed: Aug. 6, 1996

[51] Int. Cl.⁷ .................................................. G06F 17/30
[52] U.S. Cl. ............................ 707/200; 707/10; 707/102
[58] Field of Search ........................ 340/825.34; 348/17; 379/89, 201, 67, 88, 112, 114, 207, 308, 93, 266; 707/101, 200, 10, 102; 395/200.57, 187.01; 455/414

[56] References Cited

U.S. PATENT DOCUMENTS

| | | | |
|---|---|---|---|
| 4,797,910 | 1/1989 | Daudelin | 379/67 |
| 4,922,519 | 5/1990 | Dauldelin | 379/112 |
| 5,163,083 | 11/1992 | Dowden et al. | 379/88 |
| 5,181,237 | 1/1993 | Dowden et al. | 379/88 |
| 5,315,705 | 5/1994 | Iwami et al. | 395/200 |
| 5,434,974 | 7/1995 | Loucks et al. | 707/101 |
| 5,442,693 | 8/1995 | Hays et al. | 379/308 |
| 5,483,586 | 1/1996 | Sussman | 379/201 |
| 5,524,141 | 6/1996 | Braun et al. | 379/93 |
| 5,684,866 | 11/1997 | Florindi et al. | 379/114 |
| 5,708,422 | 1/1998 | Blonder et al. | 340/825.34 |
| 5,732,219 | 3/1998 | Blumer et al. | 395/200.57 |
| 5,740,231 | 4/1998 | Cohn et al. | 379/89 |
| 5,751,338 | 5/1998 | Ludwig, Jr. | 348/17 |
| 5,757,900 | 5/1998 | Nagel et al. | 379/207 |
| 5,758,069 | 5/1998 | Olsen | 395/187.01 |
| 5,835,570 | 11/1998 | Wattenbarger | 379/67 |
| 5,850,433 | 12/1998 | Rondeau | 379/201 |
| 5,873,032 | 2/1999 | Cox et al. | 455/414 |
| 5,943,417 | 8/1999 | Cox et al. | 379/266 |

FOREIGN PATENT DOCUMENTS

| | | | |
|---|---|---|---|
| 0 238 257 | 3/1987 | European Pat. Off. | H04M 3/50 |
| 0 576 141 | 5/1993 | European Pat. Off. | H04M 3/50 |

*Primary Examiner*—Wayne Amsbury
*Assistant Examiner*—Thuy Pardo
*Attorney, Agent, or Firm*—Kenyon & Kenyon

[57] ABSTRACT

A universal directory service (UDS) provides the communication addresses of individuals associated with numerous different institutions, and can be accessed via more than one communication channel. A UDS server communicates with one or more data sources to provide directory information to a user. The UDS also provides supplemental information such as company name, logo, and specialty. The UDS can be accessed via numerous communication channels including the internet, on-line service providers, wireless devices, modem, dedicated access channels, voice access via an attendant, and voice access via a speech recognition and synthesis system.

34 Claims, 2 Drawing Sheets

UNIVERSAL DIRECTORY SERVICE

BACKGROUND OF THE INVENTION

This invention relates to directory services. More particularly, this invention relates to a directory service which provides the communication addresses of individuals associated with numerous different institutions, and which can be accessed via more than one communication channel.

Due to the rapid growth in on-line and wireless technology, many individuals today (especially white-collar professionals) can be reached at numerous communications addresses. An individual's communication addresses may include a business telephone number, a home telephone number, a fax number, a cellular telephone number, a pager number, a personal reach service number, an e-mail address, a home page URL, a personal communications service (PCS) number, and a secretary/reach telephone number.

Obtaining this information for a particular individual can be difficult and time consuming. Often, several sources must be consulted before the desired information is tracked down, forcing one to make repeated attempts to locate the information. This can be time consuming and potentially costly, especially if the person is far away or in another country. Sometimes the information appears on business cards, but one often does not have the necessary business card at-hand when attempting to reach a person. Furthermore, the number of ways to reach someone has become so large that business cards have become cumbersome, awkward, unattractive, and confusing.

Currently, there is no centralized directory service which provides a person's numerous communications addresses. Furthermore, there is no centralized directory service which provides all of the communication addresses of individuals associated with different companies. The list of phone numbers contained in local "white pages" directories is typically limited to home and front-desk business numbers. Some corporations and universities maintain on-line directories which are accessible via the internet. However, these directories provide limited information such as a primary telephone number and e-mail address. Some companies, such as AT&T, maintain internal directories which can only be accessed by employees. AT&T's internal directory provides the telephone number, FAX number, e-mail address, and mailing address of certain individuals associated with AT&T, among other information such as company organizational information and the individual's work location and room number.

Looking for the communication addresses of individuals associated with different companies using on-line directories maintained by corporations and other institutions can be time consuming for several reasons. First, one has to determine the e-mail address of the particular institution where the desired information resides. Second, such directories may not have the particular communication address one is looking for. Third, one is required to access a separate on-line directory for each company, which can be tedious and time consuming when searching for the numbers of several individuals employed at different companies.

In view of these and other drawbacks of current directory services, it is an object of this invention to provide a directory service that enables a user to obtain from a centralized location the communication addresses of individuals from numerous different institutions.

It is a more particular object of this invention to provide a directory service which provides all of the communication addresses of an individual in a centralized location.

It is a still more particular object of this invention to provide a directory service which provides supplemental information in addition to an individual's communications addresses.

It is a further object of this invention to provide a directory which can be accessed via numerous communication channels.

SUMMARY OF THE INVENTION

These and other objects of the invention are accomplished in accordance with the principles of the invention by providing a universal directory service ("UDS") server which communicates with one or more database servers containing directory information relating to individuals from various different companies. In a preferred embodiment, the UDS server communicates with (1) a local directory server containing directory information relating to the UDS provider and additional hosted companies, (2) on-line directory servers maintained by corporations from which the provider has received proper permission to access, (3) a local database server which contains directory information gathered by the provider and third parties, and (4) a white pages directory server which contains directory information relating to private individuals.

The UDS server can be accessed via the internet, on-line service providers, wireless communication channels, dial-up communication channels, dedicated communication channels, telephone connections to attendants, and telephone connections to a voice recognition and synthesis system.

In addition to the numerous communication addresses of an individual, the UDS server also provides supplemental information such as the type of business the individual or company is engaged in, specialties or particular accomplishments, business hours, prices, organizational charts, responsibilities of the individual within the company, and maps logos, trademarks, and other graphical images.

This invention provides a convenient, inexpensive, and quick way for a user to obtain the communication addresses of someone with whom they wish to communicate. It eliminates the need to make repeated telephone calls to obtain a communications address, and the need to maintain printed directories. Furthermore, by maintaining current communication addresses on the UDS, one can avoid the time and expense of having to reprint business cards whenever one's company title, business address, or communication address changes. This invention may also facilitate a return to the time when business cards contained only a person's name and company since all of a person's communications addresses are available through the universal directory.

Further features of the invention, its nature and various advantages will be more apparent from the accompanying drawing and the following detailed description of the preferred embodiments.

DETAILED DESCRIPTION OF THE PREFERRED EMBODIMENTS

This invention can be used to provide the communication addresses and supplemental information of any entity that desires to be listed on the universal directory. Such entities include, but are not limited to, corporations, universities, colleges, non-profit organizations, government agencies, partnerships, individuals, and the like. Institutions and corporations are referred to for purposes of illustration throughout this text.

Figure 1:
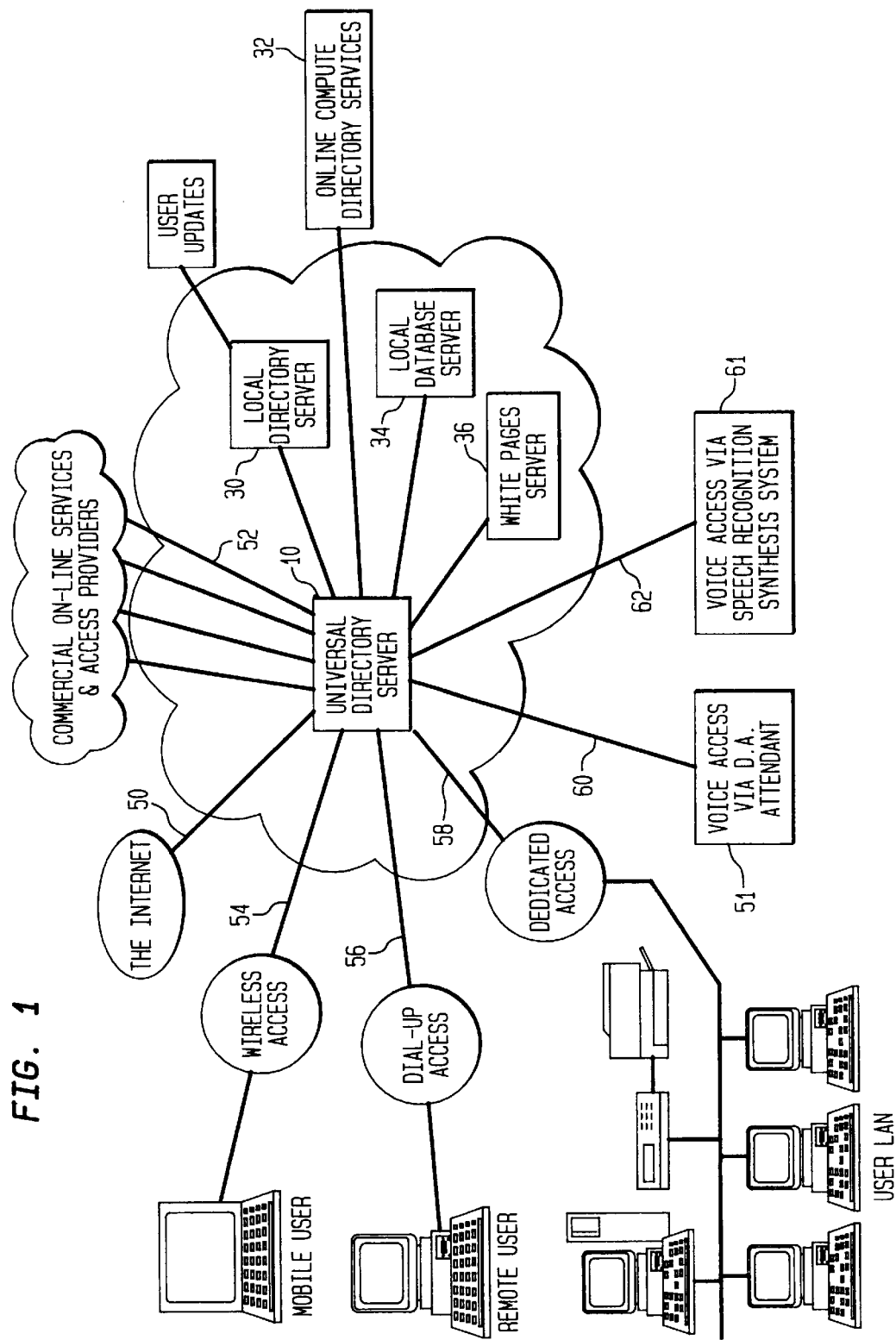
FIG. 1 is a simplified block diagram of preferred apparatus for implementing a directory service in accordance with this invention.

In a preferred embodiment of this invention shown in FIG. 1, UDS server 10 communicates with local directory server 30, on-line corporate directory servers 32, local database server 34, and white pages server 36.

Local directory server 30 preferably is maintained by the UDS provider and may be located near UDS server 10. In addition to maintaining directory information relating to the UDS provider itself, local server 30 preferably contains directory information of hosted institutions which have contracted with the UDS provider to maintain their directories. Thus, local server 30 preferably contains the communication addresses of individuals associated with both the UDS provider and hosted institutions.

On-line corporate directory servers 32 are maintained by corporations or other institutions and can be accessed via the internet. UDS server 10 communicates with the on-line directory servers of those corporations and institutions that have given the universal directory service provider proper permission to do so. In this manner, the UDS server is able to access the directories of corporations and institutions other than those hosted by the UDS provider.

Database server 34 preferably contains information collected by the UDS provider. This information may be collected from customers who have given the provider permission to provide information relating to them, and from updates provided by UDS users (discussed further below). Such information may also be collected during the course of ordinary business. Server 34 preferably also includes information collected by third parties including subscription lists of professional and trade journals, member lists of professional societies, alumni lists, and other sources.

White pages server 36 preferably contains the communications addresses of private individuals. With the growing popularity of the internet, many individuals may wish to have their personal e-mail address(es), home page URL, and the like listed on the UDS. Such information, as well as the communication addresses of other individuals and institutions, preferably is maintained on white pages server 36. In an alternate embodiment (not shown), rather than providing a separate white pages server, the communications addresses of private individuals are stored on the local directory server 30. This eliminates the need to maintain a separate white pages directory.

In a preferred embodiment, those listed on the service can log-on to the service at any time in order to update their directory information. The information maintained on the UDS is thus kept current and complete.

In FIG. 1, local directory server 30, local database server 34, and white pages server 36 are shown as separate from the UDS server 10. However, in alternative embodiments (not shown), one or more of servers 30, 32, and 34 are maintained on the same hardware, and controlled by the same software, as the UDS server.

UDS server 10 can be accessed via numerous communication channels. A user having an internet account can access server 10 via internet communication channel 50. A user subscribing to an on-line access provider can access the UDS server via on-line communication channel 52. A user having a computer (such as a laptop) capable of wireless communication can access the UDS server via wireless communication channel 54. A user having a computer with a modem can access the UDS server using dial-up communication channel 56.

A user may also access the UDS server via a dedicated communication channel. As shown in FIG. 1, the user is part of a local area network (LAN) having dedicated communication channel 58 which communicates with the UDS server.

A user may also access the UDS using a conventional telephone. A user can phone attendant 59 operating a computer which communicates with the UDS server via attendant communication channel 60. In this case, the user tells the attendant the information he or she is looking for and the attendant initiates a search on the UDS. The attendant then relays the search results to the user over the telephone.

The user can also access the UDS server by phoning voice recognition and synthesis system 61. The voice recognition system communicates with the UDS server via communication channel 62. The user is able to search for information on UDS by speaking appropriate commands to the voice recognition system. The voice recognition system initiates a search on the UDS and conveys the results to the user using a synthesized or pre-recorded voice. The voice recognition system can be implemented using voice recognition techniques known to those skilled in the art.

The UDS server is able to provide directory information about individuals associated with many different companies. This invention eliminates the need for one to consult several different sources in order to find a particular communication address. When looking for the communication addressees of several individuals associated with different companies, the user need consult only the UDS, rather than the directories of the separate companies.

The UDS preferably provides all of the communication addresses of those listed on the service. Such addresses include, but are not limited to, a business telephone number, a home telephone number, a fax number, a cellular telephone number, a pager number, a personal reach service number, an e-mail address, a home page URL, a personal communications service number, a secretary/reach telephone number, and other addresses. In this manner, a user can obtain any one of an individual's communication addresses from a convenient, centralized source.

The UDS preferably provides supplemental information in addition to communication addresses. Supplemental information provided by the UDS preferably includes, but is not limited to, the type of business the individual or company is engaged in (e.g., a "yellow pages" type of category), specialties or particular accomplishments of the individual or company, business hours, prices, organizational charts, responsibilities of the individual within the company, and maps, logos, trademarks, and other graphical images.

Figure 2:
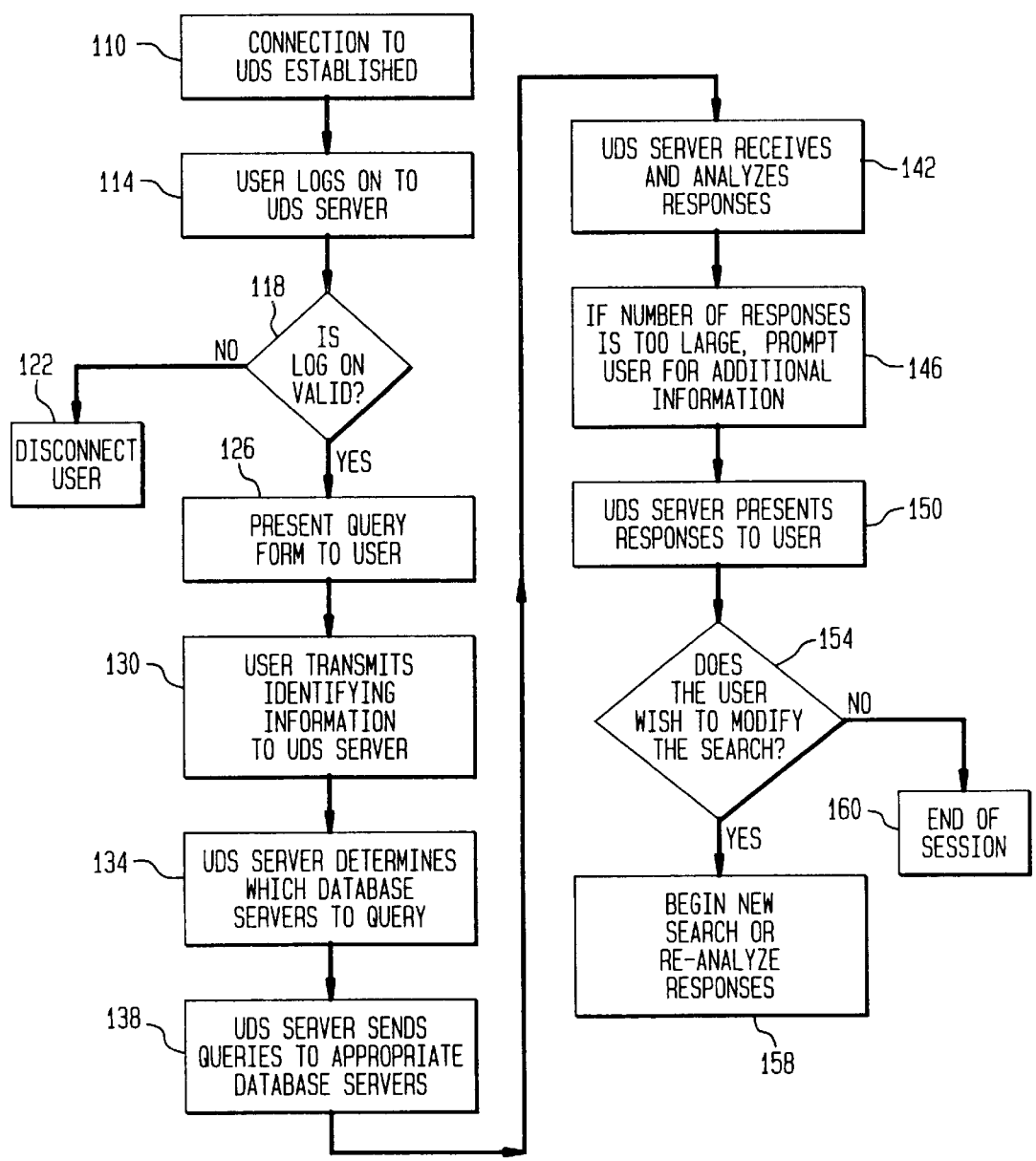
FIG. 2 illustrates a preferred sequence of steps for operating the apparatus of FIG. 1 in accordance with this invention.

FIG. 2 shows a preferred sequence of steps for operating the universal directory service of FIG. 1 in accordance with this invention.

In step 110, user connection to the UDS server is established via any one of communication channels 50, 52, 54, 56, 58, and 62 discussed above. When a user accesses the UDS using attendant communication channel 60, the attendant carries out the steps described below using information provided by the user, with the exception that the attendant preferably does not log on separately for each user, but is continuously logged on the UDS server. The user in this case may be required to provide a password or personal identification number (PIN) for billing purposes.

In step 114, the user logs on to the UDS. The UDS determines if the log-on is valid in step 118. It is preferable to provide security step 118 so that unauthorized persons do have access to the UDS. For example, the user may be required to provide a password or PIN in order to access the UDS. If the log-on is invalid, the user is disconnected in step 122. It is preferable to permit the user to attempt to log-on more than once before disconnecting the user at step 122, in order to allow the user to correct errors made when entering a password for example.

If the log-on is valid, the UDS presents a query form to the user in step 126. The query form enables the user to input information identifying the individual of interest. In general, any known technique for specifying identifying information when searching a database can be used at this step. Many such techniques are known to those skilled in the art. In a preferred embodiment, the user is prompted to input a field of parameters. For example, a field may consist of the name of the individual, the company the individual is associated with, and the state in which the company is located. Other fields specifying more information may be used in accordance with this invention.

The query form preferably appears on the display screen of the user's computer, or on the display screen of the attendant's computer when accessing the UDS via a telephone attendant. When accessing the UDS via the voice recognition and synthesis system, the system preferably communicates using simulated or pre-recorded speech, while the user simply speaks to the system.

The UDS preferably allows the user to search using incomplete identifying information. The user preferably can specify a unknown field parameter using an appropriate signal. This can be done, for example, by leaving one of the field parameters blank. The user preferably can specify unknown characters using an appropriate character. This can be done, for example, by substituting an asterisk for the unknown character. The user preferably can specify boolean combinations of identifying information using the logical operators AND, OR, NOT, and the like.

In step 130, the user transmits the identifying information to the UDS server.

In step 134, the UDS server receives the identifying information specified by the user, and determines which of servers 30, 32, and 34 to query. This is done in order to eliminate from the search those servers which do not contain the desired information, thereby conserving computing resources, and increasing the speed of the search process. Techniques for accomplishing this step are well known to those skilled in the art.

In step 138, the UDS server transmits a query to each of the servers which it found appropriate at step 134. The UDS server accesses each server using its own protocol. On-line Corporate servers 32, in particular, may have different access protocols. If any of the servers are implemented on the same hardware and software as the UDS server, the query preferably is transmitted within the software.

In step 142, the UDS server receives the responses from each of the queried servers. The UDS server analyzes these responses in order to discard information that does not match the identifying information provided by the user. Techniques for carrying out this process are well known to those skilled in the art.

In step 146, the UDS server determines if the number of listings matching the identifying information provided by the user is excessive. If the number is excessive, the server prompts the user to input additional identifying information. It may be necessary to repeat this step in some instances in order to reduce the responses to a useful number. If the user is unable to reduce the number of responses by specifying additional information, the user preferably is given the option of terminating the search or receiving all of the information, if practical.

In step 150, the UDS server transmits the response or responses to the user. The responses can be formatted in any known manner. For example, they can be arranged in alphabetical order, or in order of estimated accuracy. Techniques for estimating the accuracy of the responses are well known in the art.

In step 154, after transmitting the responses to the user, the UDS server permits the user to modify the search. The user can, for example, specify additional identifying information.

If the user chooses to modify the search, the UDS server re-analyzes the responses of the previous search (or initiates a new search if necessary) in step 158.

On the other hand, if the user does not want to modify the search or begin a new search, the search session is terminated at step 162. A billing record preferably is produced at this point if usage-based pricing is in effect for the user. Some users may receive access for a flat rate which does not depend on the number of searches carried out or the amount of time logged on to the server. In this case, preferably no billing record is produced at the end of the session.

In an alternative embodiment (not shown), information is provided to the user in two stages in step 150. Rather than providing all of the directory information at once, the UDS first transmits the communication addresses of the matching responses. Then, upon the user's request, the corresponding supplemental information is transmitted to the user. Such a two-stage process is useful if the UDS provider desires to implement a two-tiered billing system in which the user is charged an additional fee to receive the supplemental information.

In another alternative embodiment (not shown), a user accessing the UDS via a computer can dial a displayed phone number simply by clicking on an appropriate icon within the display screen of the computer. In this embodiment, the user's telephone is coupled to the computer so that the computer causes the telephone to dial the selected number.

It will be clear to those skilled in the art that the UDS server can be programmed to perform the above steps using known programming techniques. It will also be clear to those skilled in the art that software for accessing the UDS server in accordance with this invention can be provided using known programming techniques.

Thus, a universal directory service which provides the communication addresses of individuals associated with numerous different institutions, and which can be accessed via more than one communication channel has been described. Those skilled in the art will appreciate that the invention can be practiced in other than the described embodiments, which are presented for purposes of illustration and not of limitation.

The invention claimed is:

1. A method of operating a directory service in order to provide directory information to a user of said directory service comprising the steps of:

provide a plurality of communications channels for accessing said directory service;

receiving identifying information relating to an individual via one of said communication channels;

searching at least two data sources using said identifying information in order to retrieve communication address information useful for contacting said individual, wherein said at least two data sources contain information relating to a plurality of individuals listed on the directory service, and said plurality of individuals are associated with different entities, and wherein at least one of said at least two data sources is maintained by an entity distinct from the entity providing said directory service; and transmitting said communication address information useful for contacting said individual to the user via said one of said communication channels.

2. The method of claim 1 wherein said step of searching at least one data source comprises transmitting a query to at least one server.

3. The method of claim 2 wherein said step of transmitting a query to at least one server comprises transmitting a query to each of a local directory server, an on-line corporate server, a local database server, and a white pages server.

4. The method of claim 2 wherein said at least one server comprises a local directory server.

5. The method of claim 4 wherein said local directory server includes communication address information relating to the directory provider and institutions hosted by the directory provider.

6. The method of claim 2 wherein said at least one server comprises an on-line corporate server.

7. The method of claim 2 wherein said at least one server comprises a local database server.

8. The method of claim 2 wherein said at least one server comprises a white pages server.

9. The method of claim 1 further comprising, before said searching step, the step of processing said identifying information in order to identify at least one of a plurality of data sources as appropriate for searching, and wherein said searching step comprises:

searching said identified at least one of said plurality of data sources using said identifying information in order to retrieve communication address information useful contacting said individual.

10. The method of claim 1 further comprising the step of permitting said plurality of individuals listed on the directory service to update their communication address information.

11. The method of claim 1 wherein said different entities comprise corporations, institutions, individuals, and universities.

12. The method of claim 1 wherein said searching step further comprises retrieving supplemental information relating to said individual.

13. The method of claim 12 wherein said supplemental information comprises a type of business, a specialty, business hours, prices, an organizational chart, a map, and a logo.

14. The method of claim 1 wherein said a plurality of communication channels comprise an internet communication channel, an on-line service provider communication channel, a wireless communication channel, a dedicated communication channel, and an attendant communication channel, and a speech recognition and synthesis system communication channel.

15. A directory service for providing directory information to a user of said service comprising:
a server;
a plurality of communication channels for accessing said server; and
at least two data sources which communicate with said server, wherein at least one of said at least two data sources is maintained by an entity distinct from the entity providing the directory service, and which contain information relating to a plurality of individuals listed on the directory service, said plurality of individuals being associated with different entities, and wherein:

when identifying information relating to an individual is received by said server from the user via one of said plurality of communication channels, said server searches at least one of said at least two data sources using said identifying information in order to retrieve communication address information useful for contacting said individual, and then transmits said communication address information useful for contacting said individual to the user via said one of said communication channels.

16. The apparatus of claim 15 wherein said server searches at least one of said at least one data source by transmitting a query to at least one data server when identifying information is received by said server from the user via one of said plurality of communication channels.

17. The apparatus of claim 16 wherein said at least one data server comprises a local directory server.

18. The apparatus of claim 17 wherein said local directory server includes communication address information relating to the directory service provider and institutions hosted by the directory provider.

19. The apparatus of claim 16 wherein said at least one data server comprises a corporate on-line server.

20. The apparatus of claim 16 wherein said at least one data server comprises a local database server.

21. The apparatus of claim 16 wherein said at least one data server comprises a white pages server.

22. The apparatus of claim 16 wherein said server transmits a query to each of a local directory server, a corporate on-line server, a local database server, and a white pages server when identifying information is received by said server from the user via one of said plurality of communication channels.

23. The apparatus of claim 16 wherein said different entities comprise corporations, institutions, individuals, and universities.

24. The apparatus of claim 15 wherein said server retrieves from said at least one of said at least two data sources supplemental information with said communication address information.

25. The apparatus of claim 24 wherein said supplemental information comprises a type of business, a specialty, business hours, prices, an organizational chart, a map, and a logo.

26. The apparatus of claim 15 wherein said a plurality of communication channels comprises an internet communication channel, an on-line service provider communication channel, a wireless communication channel, a dedicated communication channel, and an attendant communication channel, and a speech recognition and synthesis system communication channel.

27. The apparatus of claim 15 wherein said at least one of said at least two data sources comprises a plurality of data servers, and wherein said server processes said identifying information in order to identify at least one of said plurality of data servers as appropriate for searching, and then searches said identified at least one of said plurality of data servers using said identifying information in order to retrieve communications address information useful for contacting said individual when identifying information is received by said server from the user via one of said plurality of communication channels.

28. The apparatus of claim 27 wherein said plurality of data servers comprise a local directory server, a plurality of on-line corporate servers, a local database server, and a white pages server.

29. A method of operating a directory service in order to provide directory information to a user of said service comprising the steps of:

receiving a request from the user containing identifying information about an individual;

accessing at least two data sources, wherein at least one of said at least two data sources contains information relating to a plurality of individuals that is provided by an entity other than that providing the directory service;

searching said at least two data sources for communication address information useful for contacting said individual;

transmitting said communication address information to the user.

30. The method of claim 28 wherein said steps of receiving and transmitting are accomplished via a computer network.

31. The method of claim 29 wherein said steps of receiving and transmitting are accomplished via wireless communication.

32. The method of claim 29 wherein said steps of receiving and transmitting are accomplished via a telephone connection to an attendant.

33. The method of claim 29 wherein said steps of receiving and transmitting are accomplished via a telephone connection to a speech recognition and synthesis system.

34. The method of claim 29 wherein said entity is a corporation, institution, individual, or university.

* * * * *

UNITED STATES PATENT AND TRADEMARK OFFICE
CERTIFICATE OF CORRECTION

PATENT NO. : 6,065,016
DATED : May 16, 2000
INVENTOR(S) : Stuntebeck et al.

It is certified that error appears in the above-identified patent and that said Letters Patent is hereby corrected as shown below:

Claim 2,
Line 15, change "one data source" to -- two data sources --.

Claim 16,
Line 20, change "one data source" to -- two data sources --.

Signed and Sealed this

Nineteenth Day of March, 2002

Attest:

JAMES E. ROGAN
Attesting Officer    Director of the United States Patent and Trademark Office